H. E. SNODGRASS.
METHOD OF WELDING THE MEETING EDGES OF METALLIC ARTICLES.
APPLICATION FILED JAN. 10, 1912. RENEWED JAN. 2, 1914.
1,086,337.
Patented Feb. 3, 1914.
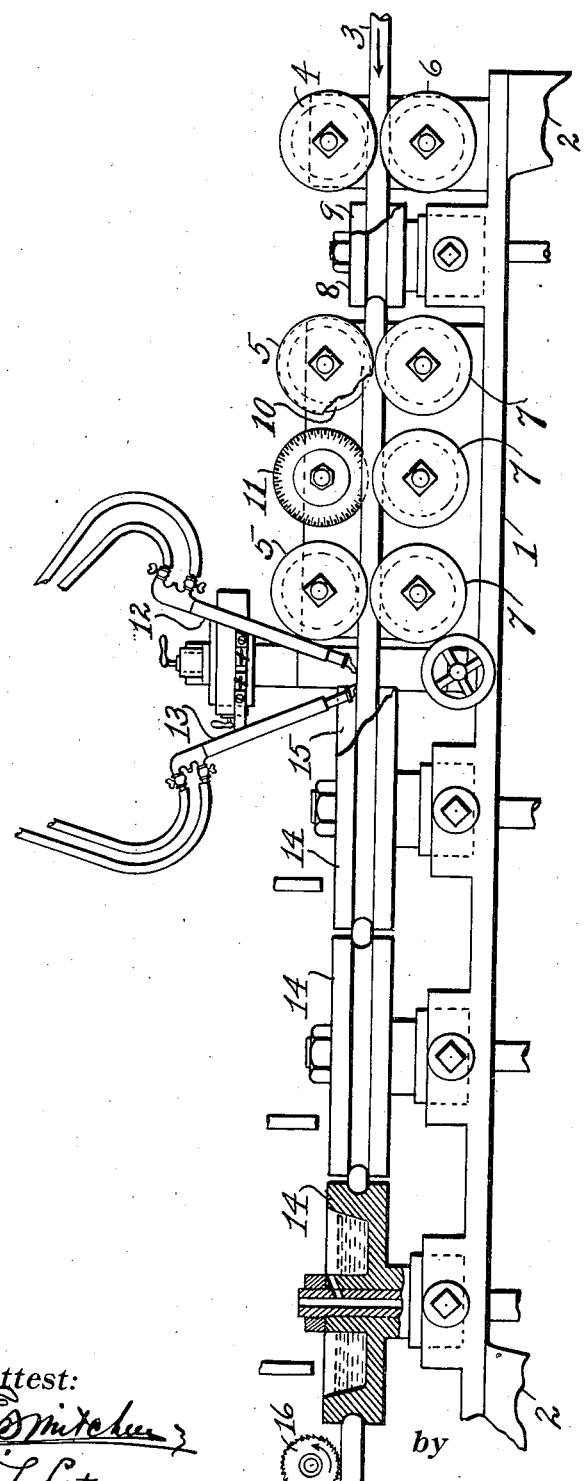
Attest:
Jos. B. Mitchell
R. L. Peterson
Harlan Eskey Snodgrass
Inventor:
by Otto Munk
his Atty

UNITED STATES PATENT OFFICE.

HARLAN ESKEY SNODGRASS, OF NEWARK, NEW JERSEY.

METHOD OF WELDING THE MEETING EDGES OF METALLIC ARTICLES.

1,086,337. Specification of Letters Patent. Patented Feb. 3, 1914.

Application filed January 10, 1912, Serial No. 670,402. Renewed January 2, 1914. Serial No. 810,050.

*To all whom it may concern:*

Be it known that I, HARLAN ESKEY SNODGRASS, a citizen of the United States of America, residing at Newark, in the county of Essex and State of New Jersey, have invented certain new and useful Improvements in Methods of Welding the Meeting Edges of Metallic Articles, of which the following is a specification.

My invention relates to methods of joining together the meeting edges of metallic articles, but has especial reference to methods of automatically and continuously welding the adjoining edges of sheets of metal in the manufacture of tubes or pipes.

The principal objects of my invention are to provide for increasing the rapidity of the welding operation and for reducing the expense thereof; for confining the direct application of heat to the meeting edges of the parts to be welded together; for increasing the strength of the weld and for insuring its uniformity throughout; for preventing variations in the dimensions of the articles produced by welding, and for removing all scale and other surface roughness resulting from the welding operation.

With these and other ends in view my invention consists in the method of operation hereinafter fully described, and more particularly pointed out in the appended claims.

For purposes of illustration and without intending to confine my invention to the use of any specific apparatus, I show on the accompanying drawing a form of apparatus which I have found well adapted for carrying out the method described hereinafter.

The drawing is a side elevation of said apparatus, with one of the horizontally-disposed rolls shown in section and another partly broken away.

In carrying out my invention in its most complete form, the following steps are involved: Heat of progressively increasing intensity is applied to the parts to be welded; relative motion is caused between said parts and the heating means; the juxtaposed surfaces of said parts are guided along a line substantially coincident with the center line of application of the heat; all bur, roughness and excess metal are removed from said juxtaposed surfaces, so as to cause true-contact between them at all points when brought together; said surfaces are separated at the point where they are finished and at the point at which the heat is applied, and are forced into contact with each other after the application of heat thereto, so as to promote the welding operation and increase the strength of the weld and insure its uniformity throughout, and all scale and surface roughness resulting from the welding operation are removed.

Referring to the drawing, in which the preferred form of apparatus for practising the method is illustrated, the numeral 1 designates the bed on which the apparatus is mounted, this bed being supported upon legs or frames 2. The tube blank 3, which has previously been rolled or otherwise bent by known means into the desired shape, is introduced between rolls 4 and 6, 5 and 7 and 8 and 9 with the seam or joint uppermost and in position to be entered by the circular guiding disk 10 with which rolls 4 and 5 are fitted. Horizontally-disposed rolls 8 and 9 are power-driven and serve to support and guide the tube and to impart longitudinal movement thereto during the welding operation. The abrading tool 11 enters the seam of the tube and has roughened or ridged faces, adapted to cut or abrade the juxtaposed surfaces of the tube blank. This tool is also power-driven.

Disks 10 guide the juxtaposed surfaces of the tube blank in their passage beneath the blowpipes, and separate said edges sufficiently to regulate the amount of metal that is removed from the blank by the finishing tool; said disks also maintain a slight separation of the edges to be welded, so as to permit the flames from the blowpipes to enter the seam and impinge upon the juxtaposed surfaces of the tube blank.

Mounted upon a suitable bracket on the bed 1 are the blowpipes 12 and 13, which are preferably of the oxy-acetylene type. Blowpipe 12 is mounted in a position such that its nozzle is inclined at a sharp angle to tube 3, and thus the lower side of the blowpipe flame impinges upon the tube. Blowpipe 13 is mounted in a more nearly vertical position, so that the tip of its flame is directed upon the tube and the application of heat from blowpipe 13 is more concentrated and intense than that from blowpipe 12.

Horizontally disposed rolls 14 and 15 are power-driven and are utilized to support and guide the tube and to assist in imparting longitudinal movement thereto; these rolls also force together the edges to be welded, after they have been acted upon by the blowpipe flames, and prevent variations in the dimensions of the articles produced by welding. A milling cutter 16 or other tool adapted for a similar purpose is mounted near the end of bed 1 toward which the tube is fed, and is power-driven to remove the scale and surface roughness resulting from the welding operation.

Having thus described my invention, what I claim as new and desire to secure by Letters Patent of the United States, is:—

1. The herein described method of welding the meeting edges of preformed tubes, which method consists in separating said edges, smoothing said edges and cutting excess metal therefrom while said edges are separated, applying heat to the edges to be welded, and maintaining said edges separated up to the point of heat application.

2. The herein described method of welding the meeting edges of preformed tubes, which method consists in separating said edges, smoothing said edges and cutting excess metal therefrom while said edges are separated, applying heat to the edges to be welded, maintaining said edges separated up to the point of heat application and thereafter forcing said edges together.

In testimony whereof I have affixed my signature in presence of two witnesses.

HARLAN ESKEY SNODGRASS.

Witnesses:
 GUSTAVUS A. RICHARDS,
 ROSCOE L. PETERSON.